US012311731B2

(12) United States Patent
Lee (10) Patent No.: US 12,311,731 B2
(45) Date of Patent: May 27, 2025

(54) APPARATUS FOR CONTROLLING ITM FOR VEHICLE AND METHOD THEREOF (71) Applicants: Hyundai Motor Company, Seoul (KR); Kia Corporation, Seoul (KR)

(72) Inventor: Jang Hyo Lee, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 198 days.

(21) Appl. No.: 17/841,436

(22) Filed: Jun. 15, 2022

(65) Prior Publication Data

US 2022/0410651 A1 Dec. 29, 2022

(30) Foreign Application Priority Data

Jun. 24, 2021 (KR) .................. 10-2021-0082528

(51) Int. Cl.
*B60H 1/00* (2006.01)
*B60H 1/32* (2006.01)
*F01P 7/16* (2006.01)
*G07C 5/02* (2006.01)

(52) U.S. Cl.
CPC ....... *B60H 1/0073* (2019.05); *B60H 1/00764* (2013.01); *B60H 1/3205* (2013.01); *F01P 7/16* (2013.01); *G07C 5/02* (2013.01); *F01P 2025/12* (2013.01); *F01P 2025/13* (2013.01); *F01P 2025/66* (2013.01)

(58) Field of Classification Search
CPC ............... F01P 2025/04; F01P 2025/06; F01P 2025/66; B60H 2001/3267; B60H 2001/3297; B60H 2001/3285; B60H 1/32
USPC ................... 62/209, 149, 129, 132
See application file for complete search history.

(56) References Cited

U.S. PATENT DOCUMENTS

| 5,507,251 | A | * | 4/1996 | Hollis | ........... F01P 7/167 123/41.1 |
| 5,669,335 | A | * | 9/1997 | Hollis | ........... F01P 7/167 123/41.31 |
| 5,910,157 | A | * | 6/1999 | Noda | ........... B60H 1/00914 62/133 |
| 6,047,770 | A | * | 4/2000 | Suzuki | ........... B60H 1/3204 62/526 |
| 2018/0087450 | A1 | * | 3/2018 | Karnik | ........... F02B 29/0443 |
| 2020/0180397 | A1 | * | 6/2020 | Jung | ........... B60H 1/3208 |
| 2020/0191099 | A1 | * | 6/2020 | Koo | ........... F02M 25/0809 |

* cited by examiner

*Primary Examiner* — Nelson J Nieves
*Assistant Examiner* — Meraj A Shaikh
(74) *Attorney, Agent, or Firm* — Morgan, Lewis & Bockius LLP (57) ABSTRACT An Integrated thermal management valve (ITM) control apparatus of a vehicle includes a driving information generator that generates driving information of the vehicle, a refrigerant pressure measuring device that measures a refrigerant pressure of a vehicle air conditioner of the vehicle, and an ITM controller that is configured to control the ITM of the vehicle, according to the generated driving information and the measured refrigerant pressure.

16 Claims, 4 Drawing Sheets

APPARATUS FOR CONTROLLING ITM FOR VEHICLE AND METHOD THEREOF

CROSS-REFERENCE TO RELATED APPLICATION

The present application claims priority to Korean Patent Application No. 10-2021-0082528, filed on Jun. 24, 2021, the entire contents of which is incorporated herein for all purposes by this reference.

BACKGROUND OF THE INVENTION

Field of the Invention

The present invention relates to an apparatus for controlling an integrated thermal management valve (ITM) for a vehicle and a method thereof.

Description of Related Art

In a typical ITM, a flow amount of a cooling water is adjusted based only on an outdoor temperature of a vehicle and/or a cooling water temperature of an engine of the vehicle. However, in the instant case, when vehicle cooling is performed by a request of the driver of the vehicle, there is a problem in that efficient thermal management cannot be performed due to a failure to consider a refrigerant pressure of a vehicle air conditioner.

Furthermore, there is a problem that the typical ITM does not efficiently perform a thermal management of the vehicle, when the cooling water temperature of the engine is expected to rise excessively, such as in specified driving situations where a torque acting on the vehicle is above a specific level.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an ITM control apparatus of a vehicle and a method thereof configured for performing efficient thermal management in consideration of a refrigerant pressure of the vehicle.

Furthermore, various aspects of the present invention are directed to providing an ITM control apparatus of a vehicle and a method thereof configured for performing efficient thermal management in consideration of a driving situations of the vehicle.

In the various exemplary embodiments of the present invention, technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, an Integrated thermal management valve (ITM) control apparatus of a vehicle according to various exemplary embodiments of the present invention includes a driving information generator that generates driving information of the vehicle, a refrigerant pressure measuring device that measures a refrigerant pressure of a vehicle air conditioner of the vehicle, and an ITM controller that is configured to control the ITM of the vehicle based on the generated driving information and the measured refrigerant pressure.

In various exemplary embodiments of the present invention, the driving information may include at least one of outdoor temperature information of the vehicle, indoor temperature information of the vehicle, speed information of the vehicle, gear stage information of the vehicle, Accel Position Sensor (APS) information of the vehicle, setting temperature information of a vehicle air conditioner, or cooling water temperature information of an engine of the vehicle.

In various exemplary embodiments of the present invention, the ITM controller may be configured to control the ITM in response that the measured refrigerant pressure is greater than a preset first value, the cooling water temperature information is greater than a preset second value, the outdoor temperature information is greater than a preset third value, and the indoor temperature information and the setting temperature information of the vehicle air conditioner are greater than a preset fourth value.

In various exemplary embodiments of the present invention, the ITM may be controlled according to one of a first table or a second table, and each of the first table and the second table may include openness information of a valve included in the ITM depending on the measured refrigerant pressure.

In various exemplary embodiments of the present invention, the first table may include first openness information of the valve depending on the measured refrigerant pressure, the second table may include second openness information of the valve depending on the measured refrigerant pressure, and a value indicated by the first openness information may be greater than a value indicated by the second openness information.

In various exemplary embodiments of the present invention, the ITM controller may be configured to control the ITM based on the first openness information included in the first table in response that the speed information of the vehicle is less than a preset fifth value, the gear stage information is less than a preset sixth value, and the APS information is less than a preset seventh value.

In various exemplary embodiments of the present invention, the ITM controller may be configured to control the ITM based on the second openness information included in the second table in response that the speed information of the vehicle is greater than or equal to a preset fifth value, the gear stage information is less than a preset sixth value, and the APS information is less than a preset seventh value.

In various exemplary embodiments of the present invention, the ITM controller may correct the first openness information based on a torque value, in response that the torque value acting on the vehicle is greater than a preset eighth value.

In various exemplary embodiments of the present invention, the ITM controller may correct the second openness information based on a torque value, in response that the torque value acting on the vehicle is greater than a preset eighth value.

In various exemplary embodiments of the present invention, the ITM controller may be configured to control the ITM based on the outdoor temperature information and the cooling water temperature information, in response that the measured refrigerant pressure is less than or equal to a preset first value, the cooling water temperature information is less than or equal to a preset second value, and the outdoor temperature information is less than or equal to a preset third value.

According to various aspects of the present invention, a method of controlling an ITM for a vehicle includes generating driving information of the vehicle, measuring a refrigerant pressure of a vehicle air conditioner of the vehicle, and controlling an integrated thermal management valve (ITM) of the vehicle, according to the generated driving information and the measured refrigerant pressure.

In various exemplary embodiments of the present invention, the driving information may include at least one of outdoor temperature information of the vehicle, indoor temperature information of the vehicle, speed information of the vehicle, gear stage information of the vehicle, Accel Position Sensor (APS) information of the vehicle, setting temperature information of a vehicle air conditioner, or cooling water temperature information of an engine of the vehicle.

In various exemplary embodiments of the present invention, the controlling of the ITM of the vehicle may include controlling the ITM in response that the measured refrigerant pressure is greater than a preset first value, the cooling water temperature information is greater than a preset second value, the outdoor temperature information is greater than a preset third value, and the indoor temperature information and the setting temperature information of the vehicle air conditioner are greater than a preset fourth value.

In various exemplary embodiments of the present invention, the ITM may be controlled according to one of a first table or a second table, and each of the first table and the second table may include openness information of a valve included in the ITM depending on the measured refrigerant pressure.

In various exemplary embodiments of the present invention, the first table may include first openness information of the valve depending on the measured refrigerant pressure, the second table may include second openness information of the valve depending on the measured refrigerant pressure, and a value indicated by the first openness information may be greater than a value indicated by the second openness information.

In various exemplary embodiments of the present invention, the controlling of the ITM of the vehicle may further include controlling the ITM based on the first openness information included in the first table, in response that the speed information of the vehicle is less than a preset fifth value, the gear stage information is less than a preset sixth value, and the APS information is less than a preset seventh value.

In various exemplary embodiments of the present invention, the controlling of the ITM of the vehicle may further include controlling the ITM based on the second openness information included in the second table in response that the speed information of the vehicle is greater than or equal to a preset fifth value, the gear stage information is less than a preset sixth value, and the APS information is less than a preset seventh value.

In various exemplary embodiments of the present invention, the controlling of the ITM of the vehicle may further include correcting the first openness information based on a torque value, in response that the torque value acting on the vehicle is greater than a preset eighth value.

In various exemplary embodiments of the present invention, the controlling of the ITM of the vehicle may further include correcting the second openness information based on a torque value, in response that the torque value acting on the vehicle is greater than a preset eighth value.

In various exemplary embodiments of the present invention, the controlling of the ITM of the vehicle may include controlling the ITM based on the outdoor temperature information and the cooling water temperature information, in response that the measured refrigerant pressure is less than or equal to a preset first value, the cooling water temperature information is less than or equal to a preset second value, and the outdoor temperature information is less than or equal to a preset third value.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, and FIG. 4.

Figure 1:
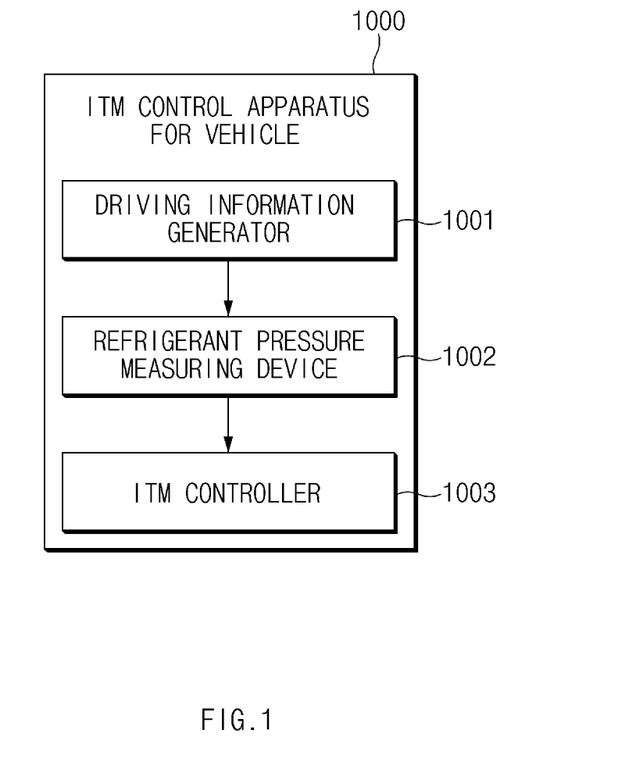
FIG. 1 is a diagram illustrating an ITM control apparatus for a vehicle according to exemplary embodiments of the present invention.

FIG. 1 illustrates an ITM control apparatus of a vehicle according to exemplary embodiments of the present invention.

This figure is a block diagram illustrating an Integrated thermal management valve (ITM) control apparatus 1000 (or an apparatus) for a vehicle according to exemplary embodiments.

The apparatus according to the exemplary embodiments may be provided outside or inside the vehicle. The vehicle according to the exemplary embodiments may include at least one of an electric vehicle (EV), a hybrid electric vehicle (HEV), and/or a plug-in hybrid electric vehicle (PHEV).

The ITM according to exemplary embodiments may represent an integrated flow valve of the vehicle. The ITM according to exemplary embodiments may include one or more valves, and may determine a flow amount of a cooling water based on an openness of each valve. In detail, the ITM may perform integrated thermal management of the vehicle (e.g., an engine) by adjusting the flow amount of the cooling water based on the openness of the valve.

In a typical ITM, a flow amount of a cooling water is adjusted based only on an outdoor temperature of the vehicle and/or a cooling water temperature of an engine of the vehicle. However, in the instant case, when vehicle cooling is performed by a request of the driver of the vehicle, there is a problem in that efficient thermal management cannot be performed due to a failure to consider a refrigerant pressure of a vehicle air conditioner.

Furthermore, there is a problem that the typical ITM does not efficiently perform a thermal management of the vehicle, when the cooling water temperature of the engine is expected to rise excessively, such as in specific driving situations where a torque acting on the vehicle is above a specific level.

Accordingly, the ITM control apparatus of a vehicle according to the exemplary embodiments may perform ITM control in consideration of the refrigerant pressure of the vehicle air conditioner to solve the above-described problems. In detail, the apparatus according to the exemplary embodiments may perform an ITM control based on the refrigerant pressure when cooling of the vehicle is performed in response to a request of a driver of the vehicle. Furthermore, the apparatus according to the exemplary embodiments may perform the ITM control based on the refrigerant pressure when a torque acting on the vehicle is equal to or greater than a predetermined level.

The apparatus according to exemplary embodiments may include a driving information generator 1001, a refrigerant pressure measuring device 1002, and/or an ITM controller 1003. An apparatus according to exemplary embodiments may further include one or more elements not illustrated in the present figure.

The driving information generator according to the exemplary embodiments may generate driving information of the vehicle.

The driving information according to the exemplary embodiments may include at least one of outdoor temperature information of the vehicle, indoor temperature information of the vehicle, speed information of the vehicle, gear stage information of the vehicle, Accel Position Sensor (APS) information of the vehicle, setting temperature information of the vehicle air conditioner, or cooling water temperature information of an engine of the vehicle. The apparatus according to exemplary embodiments may determine whether to perform a refrigerant pressure-based ITM control based on information included in the driving information.

The refrigerant pressure measuring device according to the exemplary embodiments may measure the refrigerant pressure of the vehicle air conditioner of the vehicle. The apparatus according to the exemplary embodiments may determine whether to perform the refrigerant pressure-based ITM control based on the measured refrigerant pressure.

A method of how the apparatus according to the exemplary embodiments determines whether to perform the refrigerant pressure-based ITM control based on the generated driving information and/or the measured refrigerant pressure will be described below in detail with reference to FIG. 2.

The ITM controller 1003 according to the exemplary embodiments may control the ITM of the vehicle based on the generated driving information and the measured refrigerant pressure. A method of how the ITM controller is configured to control the ITM according to the exemplary embodiments will be described in detail later with reference to FIG. 2.

The apparatus according to the exemplary embodiments may perform the ITM control based on the refrigerant pressure by the method described in the present figure. In detail, the apparatus according to the exemplary embodiments may perform efficient thermal management by performing the ITM control based on the refrigerant pressure when the cooling of the vehicle is performed and the cooling water temperature of the engine is expected to increase due to the increase in the refrigerant pressure. Furthermore, the apparatus according to the exemplary embodiments may perform efficient thermal management by performing the ITM control based on the refrigerant pressure when the cooling water temperature of the engine is expected to increase due to an instantaneous increase in a torque acting on the vehicle.

Figure 2:
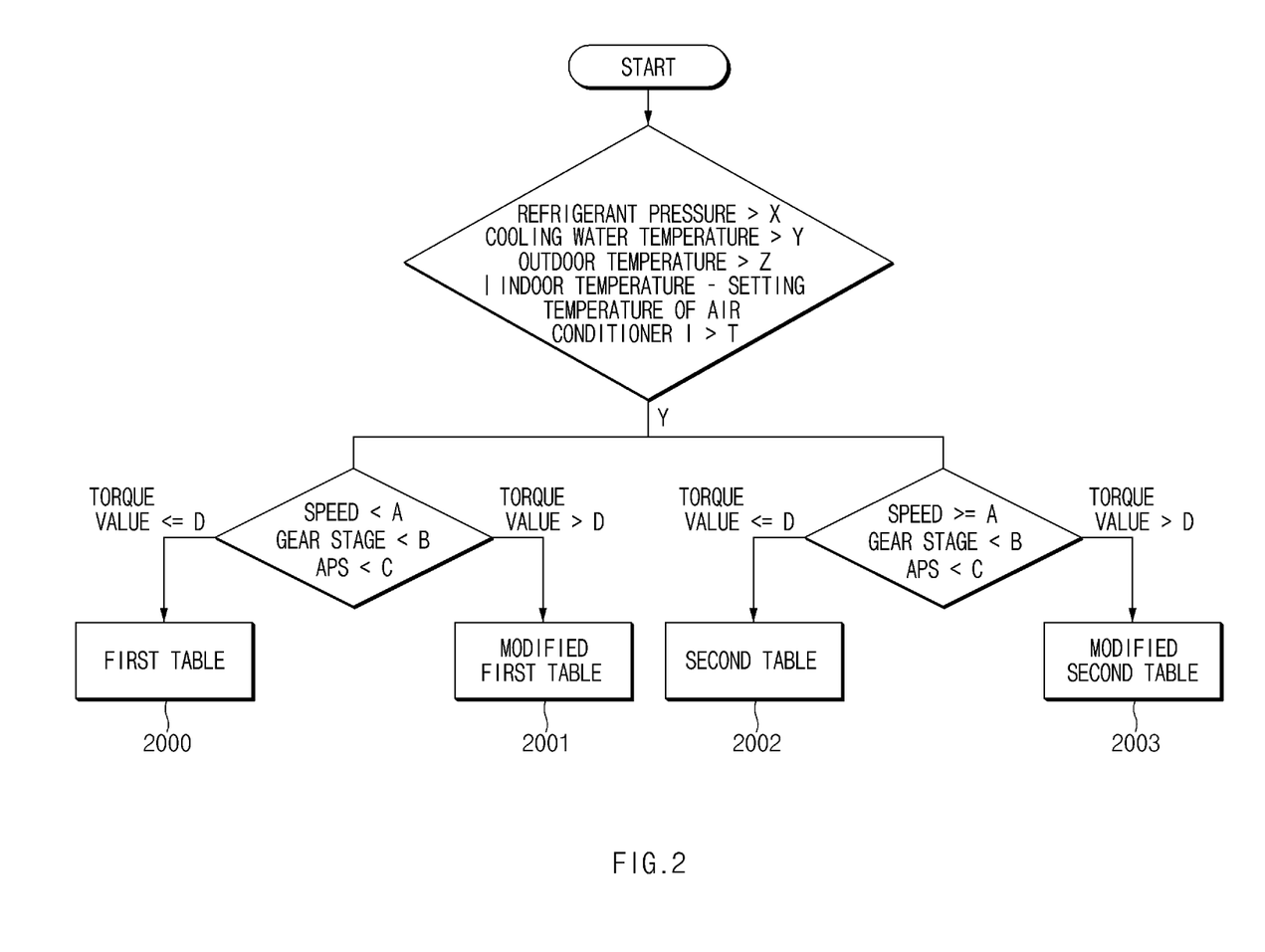
FIG. 2 is a diagram illustrating an operation of an ITM controller according to exemplary embodiments of the present invention.

FIG. 2 illustrates an operation of an ITM controller according to exemplary embodiments of the present invention.

This figure is a flowchart illustrating an example of an operation of an ITM controller (the ITM controller 1003 described above in FIG. 1) according to exemplary embodiments.

As described above with reference to FIG. 1, the ITM controller according to exemplary embodiments may control the ITM based on the refrigerant pressure of the air conditioner of the vehicle.

In the ITM controller according to the embodiments, the ITM controller is configured to control the ITM in response that the measured refrigerant pressure is greater than a preset first value, the cooling water temperature information is greater than a preset second value, the outdoor temperature information is greater than a preset third value, and the indoor temperature information and the setting temperature information of the air conditioner are greater than a preset fourth value. The above-described first to fourth preset values may be values preset by a user and/or values determined by a system.

In detail, the ITM controller according to the exemplary embodiments may perform the ITM control based on the refrigerant pressure in response that the outdoor air temperature, the refrigerant pressure, and the cooling water temperature are above specific levels. Furthermore, the ITM controller according to the exemplary embodiments may perform the ITM control based on the refrigerant pressure in response to a case in which the vehicle air conditioner of the vehicle works because a difference between the indoor temperature and the set temperature of the air conditioner is greater than or equal to a specific level.

The ITM controller according to exemplary embodiments may perform the ITM control based on the refrigerant pressure, based on at least one of a first table 2000, a modified first table 2001, a second table 2002, and/or a modified second table 2003. The first to second tables according to the exemplary embodiments are tables for the ITM control based on the refrigerant pressure, and may include information on the openness of the valve included in the ITM depending on the measured refrigerant pressure information.

The first table according to the exemplary embodiments may include an openness of the valve depending on the refrigerant pressure when the vehicle is traveling at a low speed, i.e., a speed lower than a predetermined speed. The second table according to the exemplary embodiments may include an openness of the valve depending on the refrigerant pressure when the vehicle is traveling at a high speed, i.e., a speed higher than a predetermined speed. When the vehicle according to the exemplary embodiments is traveling at the high speed, cooling by a driving condition (high speed driving) of the vehicle as well as cooling by the ITM control may be additionally performed. Accordingly, the openness according to the same refrigerant pressure may be lesser in the second table than in the first table.

The apparatus according to the exemplary embodiments may correct the openness of the valve depending on the refrigerant pressure defined in the first table and the second table, based on a torque value acting on the vehicle. For example, when more cooling is required by the torque acting on the vehicle, the openness of the valve depending on the refrigerant pressure defined in the first table and/or the second table may be modified to be larger. The table defining the modified openness may be referred to as the modified first table and/or the modified second table.

A detailed description of the first table, the modified first table, the second table, and/or the modified second table according to the exemplary embodiments will be described later with reference to FIG. 3.

The ITM controller according to the exemplary embodiments may control the ITM based on first openness information included in the first table, in response that the speed information of the vehicle is less than a preset fifth value, the gear stage information is less than a preset sixth value, and the APS information is less than a preset seventh value. The above-described fifth to seventh values may be values preset by a user and/or values determined by the system.

The ITM controller according to the exemplary embodiments may control the ITM based on second openness information included in the second table, in response that the speed information of the vehicle is greater than or equal to the preset fifth value, the gear stage information is less than the preset sixth value, and the APS information is less than the preset seventh value.

The ITM controller according to the exemplary embodiments may correct the first openness information based on the torque value in response that the torque value acting on the vehicle is greater than a preset eighth value. The above-described preset eighth value may be a value preset by a user and/or a value determined by the system.

The ITM controller according to exemplary embodiments may correct the second openness information based on the torque value, in response that the torque value acting on the vehicle is greater than the preset eighth value.

The ITM controller according to the exemplary embodiments may control the ITM based on the outdoor temperature information and the cooling water temperature information, in response that the measured refrigerant pressure information is less than or equal to the preset first value, the cooling water temperature information is less than or equal to the preset second value, and the outdoor temperature information is less than or equal to the preset third value. That is, in the instant case, the ITM controller may be configured to control the ITM based on a general ITM control method (general method described above in FIG. 1).

The apparatus according to the exemplary embodiments may perform the ITM control based on the refrigerant pressure by the method described in the present figure. That is, the apparatus according to the exemplary embodiments may perform efficient thermal management by performing the ITM control based on the refrigerant pressure when the cooling of the vehicle is performed and the cooling water temperature of the engine is expected to increase due to the increase in the refrigerant pressure. Furthermore, the apparatus according to the exemplary embodiments may perform the efficient thermal management by performing the ITM control based on the refrigerant pressure when the cooling water temperature of the engine is expected to increase due to an instantaneous increase in the torque acting on the vehicle.

Figure 3:
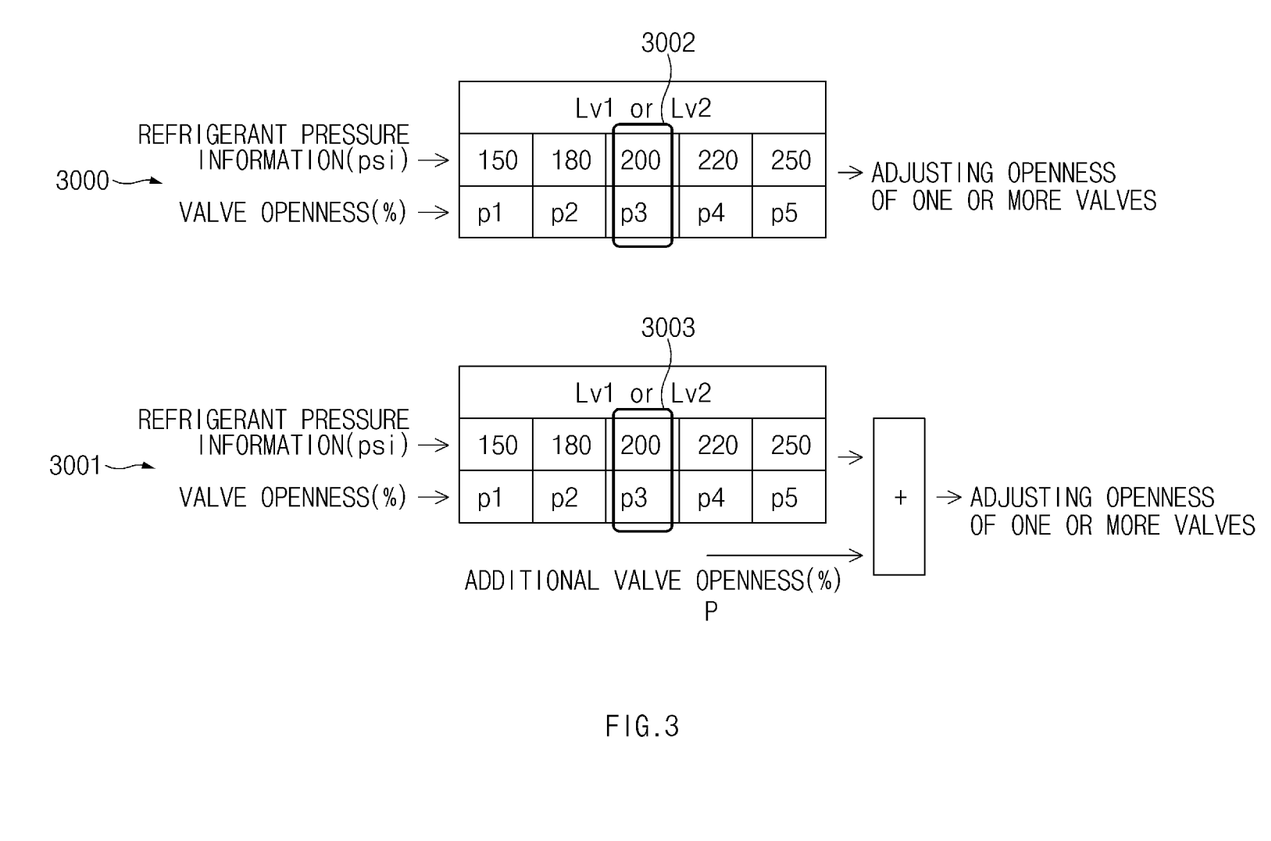
FIG. 3 is a diagram illustrating a first table and a second table according to exemplary embodiments of the present invention.

FIG. 3 illustrates an example of a first table and a second table according to exemplary embodiments.

This figure illustrates an example of a first table and a second table (the first table and the second table described above in FIG. 2) according to exemplary embodiments.

As described above with reference to FIG. 2, the first to second tables according to exemplary embodiments may include information on the openness of an ITM valve depending on the refrigerant pressure. Furthermore, as described above, the first table according to the exemplary embodiments may indicate a table corresponding to low-speed driving, and the second table may indicate a table corresponding to high-speed driving.

Reference numeral 3000 is a diagram for describing a first table and a second table according to exemplary embodiments. Reference numeral 3001 is a diagram for describing a modified first table and a modified second table according to exemplary embodiments.

As described above in FIG. 2, the openness according to the same refrigerant pressure may be lesser in the second table than in the first table. The first table according to the exemplary embodiments may include information on the first openness of the valve depending on the measured refrigerant pressure information, and the second table may include information on the second openness of the valve depending on the measured refrigerant pressure information.

Referring to reference numeral 3002, both the first table and the second table may include openness information p3 depending on the refrigerant pressure information (200 psi). According to various exemplary embodiments of the present invention, the openness information p3 may represent the above-described first openness information and the second openness information. In detail, as described above, the value indicated by the first openness information may be greater than the value indicated by the second openness information.

The apparatus according to the exemplary embodiments may perform efficient thermal management by adjusting the openness of one or more valves of the ITM, based on the above-described first table and/or second table.

As described above in FIG. 2, the apparatus according to the exemplary embodiments may correct the valve openness depending on the refrigerant pressure defined in the first table and the second table, based on the torque value acting on the vehicle. That is, the apparatus may add an additional valve openness P to the openness by the first table and/or the second table, based on the torque value acting on the vehicle. For example, the apparatus additionally adds an openness by P to an openness p3 (3003) depending on the refrigerant pressure of 200 psi, in response that the torque value acting on the vehicle is equal to or greater than a predetermined level. The above-described additional valve openness may have a positive openness or a negative openness.

A description of a condition in which the apparatus according to the exemplary embodiments applies an additional valve openness is the same as or similar to that described above in FIG. 2.

The apparatus according to the exemplary embodiments may perform efficient thermal management by adjusting the openness of one or more valves of the ITM based on the above-described modified first table and/or modified second table.

The apparatus according to the exemplary embodiments may perform the ITM control based on the refrigerant pressure by the method described in the present figure. That is, the apparatus according to the exemplary embodiments may perform efficient thermal management by performing the ITM control based on the refrigerant pressure when the cooling of the vehicle is performed and the cooling water temperature of the engine is expected to increase due to the increase in the refrigerant pressure. Furthermore, the apparatus according to the exemplary embodiments may perform the efficient thermal management by performing the ITM control based on the refrigerant pressure when the cooling water temperature of the engine is expected to increase due to an instantaneous increase in the torque acting on the vehicle.

Figure 4:
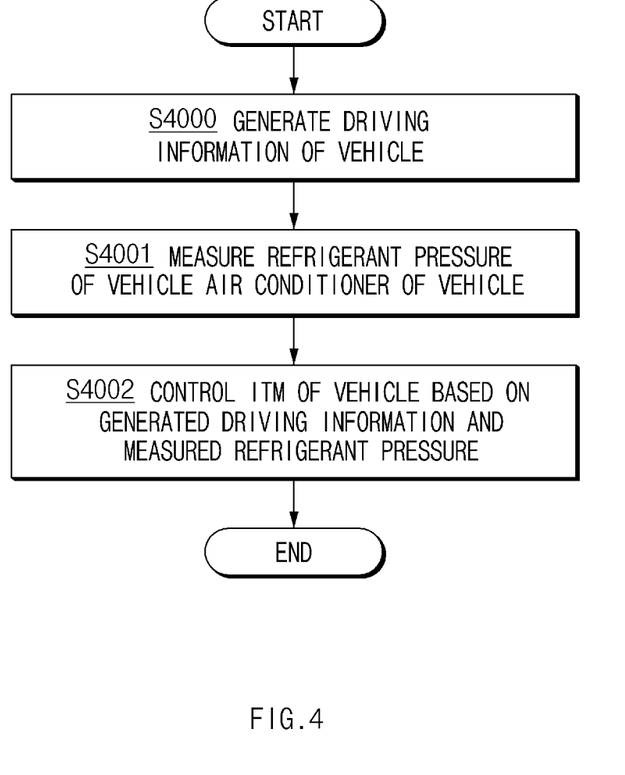
FIG. 4 is a diagram illustrating an ITM control method for a vehicle according to exemplary embodiments of the present invention.

FIG. 4 illustrates an example of an ITM control method for a vehicle according to exemplary embodiments.

This figure is a flowchart illustrating an example of an ITM control method (or a method) for a vehicle according to exemplary embodiments. The apparatus described above in FIG. 1, FIG. 2, and FIG. 3 may perform a method illustrated in the present figure.

The method according to the exemplary embodiments may include steps of generating driving information of the vehicle (S4000), measuring the refrigerant pressure of the vehicle air conditioner of the vehicle (S4001) and/or controlling the ITM of the vehicle based on the generated driving information and the measured refrigerant pressure (S4002). The driving information generator 1001 described above in FIG. 1 may perform S4000, the refrigerant pressure measuring device 1002 may perform S4001, and the ITM controller 1003 may perform S4002.

The driving information according to exemplary embodiments may include at least one of outdoor temperature information of the vehicle, indoor temperature information of the vehicle, speed information of the vehicle, gear stage information of the vehicle, Accel Position Sensor (APS) information of the vehicle, setting temperature information of the vehicle air conditioner, or cooling water temperature information of an engine of the vehicle. The description of the driving information according to the exemplary embodiments is the same as or similar to that described with reference to FIG. 1.

S4002 according to the exemplary embodiments may include controlling the ITM, in response that the measured refrigerant pressure is greater than the preset first value, the cooling water temperature information is greater than the preset second value, the outdoor temperature information is greater than the preset third value, and the indoor temperature information and the setting temperature information of the vehicle air conditioner are greater than the preset fourth value. The descriptions of the above-described steps are the same as or similar to those described above in FIG. 2.

The ITM according to exemplary embodiments may be controlled based on one of the first table or the second table. Each of the first table and the second table according to the exemplary embodiments may include information on the openness of the valve included in the ITM depending on the measured refrigerant pressure information. The descriptions of the first table and the second table according to the exemplary embodiments are the same as or similar to those described above with reference to FIG. 2 and FIG. 3.

The first table according to the exemplary embodiments may include information on the first openness of the valve according to the measured refrigerant pressure information. The second table according to exemplary embodiments may include information on the second openness of the valve according to the measured refrigerant pressure information. A value indicated by the first openness information according to exemplary embodiments may be greater than a value indicated by the second openness information. The descriptions of the first openness information and the second openness information are the same as or similar to those described above with reference to FIG. 2 and FIG. 3.

S4002 according to the exemplary embodiments may further include controlling the ITM based on the first openness information included in the first table, in response that the speed information of the vehicle is less than the preset fifth value, the gear stage information is less than the preset sixth value, and the APS information is less than the preset seventh value. The descriptions of the above-described step are the same as or similar to those described above in FIG. 2.

S4002 according to the exemplary embodiments may further include controlling the ITM based on the second openness information included in the second table, in response that the speed information of the vehicle is greater than or equal to the preset fifth value, the gear stage information is less than the preset sixth value, and the APS information is less than the preset seventh value. The descriptions of the above-described step are the same as or similar to those described above in FIG. 2.

S4002 according to the exemplary embodiments may further include correcting the first openness information based on the torque value, in response that the torque value acting on the vehicle is greater than the preset eighth value. The descriptions of the above-described step are the same as or similar to those described above in FIG. 2.

S4002 according to the exemplary embodiments may further include correcting the second openness information based on the torque value, in response that the torque value acting on the vehicle is greater than the preset eighth value. The descriptions of the above-described step are the same as or similar to those described above in FIG. 2.

S4002 according to the exemplary embodiments may include controlling the ITM based on the outdoor temperature information and the cooling water temperature information, in response that the measured refrigerant pressure information is less than or equal to the preset first value, the cooling water temperature information is less than or equal to the preset second value, and the outdoor temperature information is less than or equal to the preset third value. The descriptions of the above-described step are the same as or similar to those described above in FIG. 2.

According to various exemplary embodiments of the present invention, embodiments may perform efficient thermal management in consideration of the refrigerant pressure of a vehicle.

Furthermore, embodiments may perform efficient thermal management in consideration of a vehicle driving situation.

Furthermore, various effects may be provided that are directly or indirectly understood through the present invention.

The above description is merely illustrative of the technical idea of the present invention, and those of ordinary skill in the art to which various exemplary embodiments of the present invention pertains will be able to make various modifications and variations without departing from the essential characteristics of the present invention.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated thermal management valve (ITM) control apparatus for a vehicle, the ITM control apparatus comprising:
at least a processor; and
a memory;
wherein the at least one processor is configured to:
generate driving information of the vehicle including speed information of the vehicle, gear stage information of the vehicle, and Accelerator Position Sensor (APS) information of the vehicle;
measure a refrigerant pressure of a vehicle air conditioner of the vehicle;

control an integrated thermal management valve (ITM) of the vehicle, according to the generated driving information and the measured refrigerant pressure, wherein the ITM includes a valve;
control the ITM in response that the measured refrigerant pressure is greater than a preset first value, cooling water temperature information is greater than a preset second value, outdoor temperature information is greater than a preset third value, and indoor temperature information and setting temperature information of the vehicle air conditioner are greater than a preset fourth value; and
control the ITM based on first openness information of the valve included in a first table in response that the speed information of the vehicle is less than a preset fifth value, the gear stage information is less than a preset sixth value, and the APS information is less than a preset seventh value, and
wherein the first table includes the first openness information of the ITM depending on the measured refrigerant pressure.

2. The ITM control apparatus of claim 1,
wherein the driving information further includes at least one of the outdoor temperature information of the vehicle, the indoor temperature information of the vehicle, the setting temperature information of the vehicle air conditioner, or the cooling water temperature information of an engine of the vehicle.

3. The ITM control apparatus of claim 2,
wherein the ITM is controlled according to one of the first table or a second table, and
wherein the second table includes openness information of the valve included in the ITM depending on the measured refrigerant pressure.

4. The ITM control apparatus of claim 3,
wherein the second table includes second openness information of the valve depending on the measured refrigerant pressure, and
wherein a value indicated by the first openness information is greater than a value indicated by the second openness information.

5. The ITM control apparatus of claim 4,
wherein the at least one processor is further configured to control the ITM based on the second openness information included in the second table in response that the speed information of the vehicle is greater than or equal to the preset fifth value, the gear stage information is less than the preset sixth value, and the APS information is less than the preset seventh value.

6. The ITM control apparatus of claim 1,
wherein the at least one processor is further configured to correct the first openness information based on a torque value, in response that the torque value acting on the vehicle is greater than a preset eighth value.

7. The ITM control apparatus of claim 5,
wherein the at least one processor is further configured to correct the second openness information based on a torque value, in response that the torque value acting on the vehicle is greater than a preset eighth value.

8. The ITM control apparatus of claim 2,
wherein the at least one processor is further configured to control the ITM based on the outdoor temperature information and the cooling water temperature information, in response that the measured refrigerant pressure is less than or equal to the preset first value, the cooling water temperature information is less than or equal to the preset second value, and the outdoor temperature information is less than or equal to the preset third value.

9. A method of controlling an integrated thermal management valve (ITM) for a vehicle, the method comprising:
generating, by a processor, driving information of the vehicle including speed information of the vehicle, gear stage information of the vehicle, and Accelerator Position Sensor (APS) information of the vehicle;
measuring, by the processor, a refrigerant pressure of a vehicle air conditioner of the vehicle;
controlling, by the processor, the integrated thermal management valve (ITM) of the vehicle, according to the generated driving information and the measured refrigerant pressure, wherein the ITM includes a valve;
controlling the ITM in response that the measured refrigerant pressure is greater than a preset first value, cooling water temperature information is greater than a preset second value, outdoor temperature information is greater than a preset third value, and indoor temperature information and setting temperature information of the vehicle air conditioner are greater than a preset fourth value; and
controlling, by the processor, the ITM based on first openness information of the valve included in a first table in response that the speed information of the vehicle is less than a preset fifth value, the gear stage information is less than a preset sixth value, and the APS information is less than a preset seventh value, and
wherein the first table includes the first openness information of the valve depending on the measured refrigerant pressure.

10. The method of claim 9,
wherein the driving information further includes at least one of the outdoor temperature information of the vehicle, the indoor temperature information of the vehicle, the setting temperature information of the vehicle air conditioner, or the cooling water temperature information of an engine of the vehicle.

11. The method of claim 10,
wherein the ITM is controlled according to one of the first table or a second table, and
wherein the second table includes openness information of the valve included in the ITM depending on the measured refrigerant pressure.

12. The method of claim 11,
wherein the second table includes second openness information of the valve depending on the measured refrigerant pressure, and
wherein a value indicated by the first openness information is greater than a value indicated by the second openness information.

13. The method of claim 12,
wherein the controlling of the ITM of the vehicle further includes controlling the ITM based on the second openness information included in the second table in response that the speed information of the vehicle is greater than or equal to the preset fifth value, the gear stage information is less than the preset sixth value, and the APS information is less than the preset seventh value.

14. The method of claim 9,
wherein the controlling of the ITM of the vehicle further includes correcting the first openness information based on a torque value, in response that the torque value acting on the vehicle is greater than a preset eighth value.

15. The method of claim 13,
wherein the controlling of the ITM of the vehicle further includes correcting the second openness information based on a torque value, in response that the torque value acting on the vehicle is greater than a preset eighth value.

16. The method of claim 10,
wherein the controlling of the ITM of the vehicle includes controlling the ITM based on the outdoor temperature information and the cooling water temperature information, in response that the measured refrigerant pressure is less than or equal to the preset first value, the cooling water temperature information is less than or equal to the preset second value, and the outdoor temperature information is less than or equal to the preset third value.

\* \* \* \* \*